Patented Apr. 7, 1931

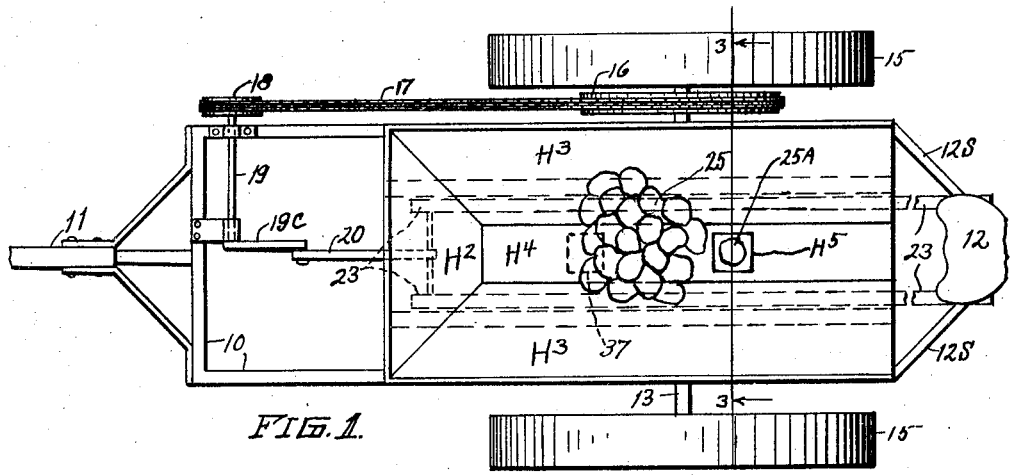

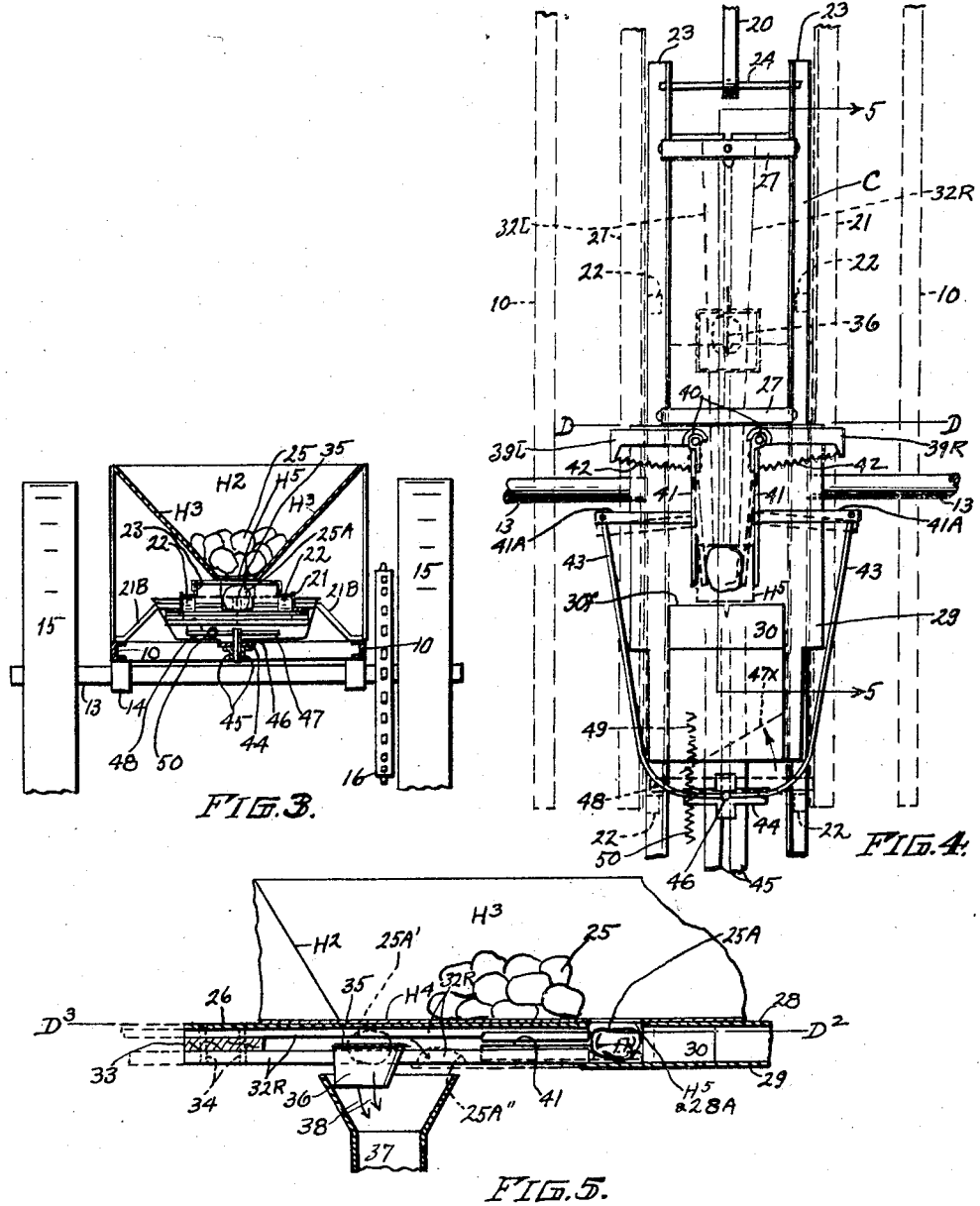

1,799,638

UNITED STATES PATENT OFFICE

JOHN E. PAULSON, OF MINNEAPOLIS, MINNESOTA

SEED-POTATO CUTTER

Application filed November 1, 1929. Serial No. 404,144.

My invention relates to seed potato planters in general and more specifically the seed potato cutting means and the main object is to provide a substantial and efficient device as hereinafter fully set forth, reference being had to the accompanying drawings, in which—

Fig. 1 is a top view of my improved seed potato cutter machine.

Fig. 2 is a left side elevation of Fig. 1.

Fig. 3 is a transverse sectional view about as on the vertical plane indicated by line 3—3 in Fig. 1 and looking toward the front of the machine.

Fig. 4 is an enlarged plan view about as on the horizontal plane indicated by line 4—4 in Fig. 2 showing mainly the reciprocable carriage of my device.

Fig. 5 is a longitudinal sectional elevation about as on line 5—5 in Fig. 4 showing mainly the potato cutting means.

Referring to the drawings by reference numerals, 10 designates an elongated quadrangular main frame, with draft means 11 at its front end and an operator's seat 12 fixed centrally of and rearward of the other end by suitable supports 12S. Said main frame is supported by a wheel axle 13 rotatably fixed in bearings 14 and suitably keyed to rotate with the ground wheels 15. 16 is a drive gear fixed on shaft 13 near one wheel 15 and driving a chain 17 running also over a drive sprocket 18 on a transverse crank shaft 19 suitably mounted in bearings 20 on the front part of the main frame (see Figs. 1 and 2).

Said shaft 19 has a crank 19C rotatable of course by movement of the ground wheels in a vertical plane longitudinally of and about central of the main frame, and imparts reciprocal movement through a connecting rod 20 of a central longitudinal carriage C in the main frame and presently to be described.

H is an elongated hopper mounted on the main frame rearwardly of said crank and comprises in part, a forward and two opposite hopper walls H2 and H3 respectively, sloping inwardly and downwardly to a hopper floor H4 extending rearwardly, centrally and longitudinally of the main frame 10 but in a plane elevated above said frame. 21 are a pair of parallel fixed rails extending forward in horizontal plane, between the hopper floor and the main frame and suitably supported as with brackets 21B (Fig. 3). 22 are pairs of rollers rotatably mounted at the inner sides of the rails 21 to support the so-called carriage C reciprocable as described by crank 19C, between said rails 21. The said carriage comprises two parallel bars 23 riding on said rollers and their front ends connected by a cross-shaft 24 to which the rear end of the connecting rod 20 is connected (see Figs. 1 and 4).

The seed potatoes 25 are stored in the hopper and gravitate of course to its base or floor H4 and forward of an aperture H5 (Figs. 1, 3, 4 and 5).

For the sake of facilitating description of my reciprocable carriage, the upper part of Fig. 4 as above line D—D is a top view as on plane D3 in Fig. 5 and below said line D—D the details shown in Fig. 4 are on a slightly lower plane as on line D2 of Fig. 5.

26 is a sheet metal plate extending between the bars 23 of carriage C and fixed to said bars by strap brackets 27 and extending normally about half way to the rear end of the carriage. On the rear half of the carriage is a corresponding plate 28 (see Fig. 5) with an aperture 28A arranged to be alined with aperture H5 of the hopper when the carriage is in extreme rear position, thus allowing a potato, as 25A in Figs. 3, 4 and 5, to drop therethrough to rest on the floor plate 29 of the carriage.

30 is a fixed block in the carriage having a front face 30f to stop rearward movement as of a potato 25A during forward movement of the carriage, it being readily understood that during such movement, plate 28 shuts the opening H5 of the hopper. The potato 25A is further held from any forward movement by the rear butt ends of a series of 4 elongated guide bars 32, arranged in pairs and spaced apart horizontally and vertically. The front ends of said bars 32 are all secured to the underside of plate 26 by a block 33 and through bolts 34 therein (see Fig. 5). The said bars extend longitudinally and rearwardly as described, are quadrangular in cross section and being spaced apart both horizontally and vertically thus provide a cross-shaped opening between them for the purpose of freely reciprocating by a potato cutting device suitably fixed to the parallel rail members 21.

Said potato cutter comprises a horizontal blade 35 with a transverse, rear cutting edge and a vertical cutter blade 36 extending downwardly from 35 (see Figs. 3, 4 and 5), both blades thus comprising a T-shape member in transverse section and so mounted that when the carriage is moving forward the potato in it is cut in two horizontally by the blade 35 and its lower half cut in two-quarters by the blade 36, the latter two parts dropping down into the chute 37 which guides the said cut parts to any suitable planting apparatus well known in the art. The said pieces may also be dropped at regular intervals into a furrow by automatically regulated means also well known in the art but comprising no part of this invention.

As just described, the two lower quarters of a potato drop freely from the cutter member when the carriage has moved to its forward extremity at which time block 30 has pushed the potato against the cutter members and completed the cutting and just at this time the potato is in position designated 25A' (Fig. 5) and the arrows 38 indicate direction of the drop of its lower quarters.

As just described, it will be understood that the upper half of the potato at position 25A' remains on top of blade 35 until the carriage begins rearward movement when the adjacent ends of members 32R and 32L will push said half of the potato rearwardly, off of the blade when it drops on the plate 29 and assumes position 25A'' and resting thus but moving rearwardly with the carriage. It stays in this position until the carriage moves again to its forward limit, remaining of course on the plate 29 and in a plane such that it in turn is cut in two by the vertical knife 36 and these two quarters of the potato in turn drop down to the furrow.

I provide further in the carriage device means for holding a potato in it and holding said potato central by contact means engaging it from opposite sides, thereby preventing sidewise movement while the carriage moves forward and holds the potato central of the carriage so that the vertical knife cuts centrally through it. These latter means are clearly shown in that part of Fig. 4 below line D—D and additionally in Fig. 3 and partly only in Fig. 5. These centering means comprise two alined arms fixed transversely of the carriage and to the under side of its top plate, in spaced relation at each side of the center, the right hand one designated 39R and the left hand one 39L. The adjacent inner ends of these bars are formed each with a socket type bearing 40 each opening rearwardly. Each socket is pivotally engaged by the hub of a rearwardly extending arm 41, each normally in parallel relation to and outwardly of the adjacent bar 32R or 32L. The outer end of each arm is connected to a part of bar 41 rearward of its pivot by a tension spring 42, both arms 41 thus being normally sprung away from the center and their free ends spaced apart, one at each side of a potato, as 25A in Fig. 4, at the time when the carriage is in its rearmost position.

By further means presently to be described, the arms 41 are pressed toward each other and engage opposite sides of potato 25A while the carriage is traveling forward and until the potato is cut, then being released to spring back to original position. Each arm 41 is provided with a rigid secondary arm 41A extending outwardly from its side and at the outer ends of both said latter arms is pivotally connected to each the forward end of a reach rod 43. Said reach rods extend rearwardly and downwardly and have their rear ends pivotally connected on a pin 46 in a cross-head 44 riding on and guided between a pair of small rails 45 mounted longitudinally of and between the parallel side members of the main frame 10 and in about a common plane therewith. This cross-head has an upright obstruction pin 46 in the path of which is mounted a lever arm 47 adapted to be swung in a horizontal plane by said pin 46 when the said cross-head is reciprocated with the carriage.

The lever 47 is fulcrumed in any suitable fixed part to one side of the path of said cross-head as at 48 (see Figs. 3 and 4). It is held normally in position transversely of the rail 45 and above it by means of tension coil springs 49 and 50 of which 49 extends forwardly under tension and 50 extends rearwardly likewise under tension. Thus when pin 46 travels forward as the carriage starts forward the lever 47 is engaged and swung forward against the yielding tension of spring 50 until the pin 46 passes the end of the lever, at which time said lever 47 springs back to normal transverse position.

As long as the pin 46 bears against lever 47 the cross-head 44 is of course retarded and this in turn pulls the reach rods 43 and these pull rearward on the secondary arms 41A, causing arms 41 to be sprung toward and engage opposite sides of potato 25A holding it central until it has been cut. The lever 47 is of such length that pin 46 passes its end and the arms 41 are released when the carriage is in foremost position. Pressure on both sides of the potato is of course not necessary after the cutting takes place and the lever 47 is so positioned that the pin 46 contacts with it when moving rearwardly also, thus having similar tension action, but holding open the arms 41 during rearward stroke. After the carriage again starts forward said half-potato is centralized by the arms 41 until it in turn is cut in two. The following rearward movement of the carriage finds it empty and the operator seated at 12 drops another potato into position to be cut into 4 pieces as has just been fully described. In Fig. 4 the equalizing springs 49—50 for lever 47 are clearly shown but the rigid means for holding them in tension is omitted, any suitable fixed part of the main frame or adjacent parts being utilized. During movement of lever 47 one spring simply is inactive while increasing the tension in the other.

I claim:

1. A seed potato cutter device including a wheel supported elongated main frame, a hopper mounted thereon, a crank shaft journaled in the front part to rotate in a plane longitudinal of the frame and means for rotating said crank operatively connected with the supporting wheels; a secondary frame mounted longitudinally and central of the main frame, a reciprocable elongated carriage in said secondary frame and operatively connected with said crank shaft, said hopper fixed over said secondary frame and having a floor adjacent to and over said carriage and provided with an aperture, a potato receiving pocket in said carriage arranged to be alined vertically below said hopper opening when the carriage is in rearmost position, and means on said carriage adapted to yieldably engage and hold said potato central of the carriage, during forward movement thereof, to a fixed potato cutting device, said potato cutter comprising a horizontal blade fixed in the path of said carriage to cut the potato in half, and a vertical knife therebelow to cut the lower half of a potato in two, and outlet means for said latter two parts to drop through from the carriage, and means operated by the rearward movement of the carriage to lower said upper half of the potato in the carriage during rearward movement and subsequently cause said half to be cut in two by the vertical knife at the end of the following forward stroke.

2. The structure specified in claim 1 in which said yieldable means for holding the potato central of the carriage comprises two normally parallel bars pivotally mounted with their forward ends in the carriage and spring means normally holding their free ends spread apart at certain periods of the movement of the carriage, means for closing the free ends of said bars toward each other to engage opposite sides of a potato during the forward movement of the carriage until the potato has been cut and for releasing said contact with the potato at the forward end of said stroke of the carriage, then to re-engage the lower half of the potato in the carriage during the following stroke until said half potato in turn is cut in two vertically.

3. The structure specified in claim 1 in which said yieldable means for holding the potato central of the carriage comprises two normally parallel bars pivotally mounted with their forward ends in the carriage and spring means normally holding their free ends spread apart at certain periods of the movement of the carriage, means for closing the free ends of said bars toward each other to engage opposite sides of a potato during the forward movement of the carriage until the potato has been cut and for releasing said contact with the potato at the forward end of said stroke of the carriage, then to re-engage the lower half of the potato in the carriage during the following rearward stroke of the carriage and its forward stroke until said half potato in turn is cut in two vertically, said means for pressing the yieldable bars against a potato in the carriage comprising a lever normally in horizontal position transversely of the secondary frame and pivoted thereto, said lever in the path of an obstruction pin movable with the carriage, spring means holding said lever normally in transverse position but yieldable either way when said pin engages the lever, reach rods connecting said pin with the said yieldable bars to move their free ends simultaneously inwardly when said pin is in frictional contact with the said lever and until the pin passes the end of said lever in either forward or rearward direction.

In testimony whereof, I affix my signature.

JOHN E. PAULSON.